(12) United States Patent
Wurzer et al.

(10) Patent No.: US 11,913,561 B2
(45) Date of Patent: Feb. 27, 2024

(54) SHUT-OFF VALVE

(71) Applicant: Volker Wurzer, Wesel (DE)

(72) Inventors: Volker Wurzer, Wesel (DE); Raphael Herbst, Peine (DE)

(73) Assignee: Volker Wurzer, Wesel (DE)

( * ) Notice: Subject to any disclaimer, the term of this patent is extended or adjusted under 35 U.S.C. 154(b) by 94 days.

(21) Appl. No.: 17/422,230

(22) PCT Filed: Jan. 10, 2020

(86) PCT No.: PCT/EP2020/050482
§ 371 (c)(1),
(2) Date: Feb. 8, 2022

(87) PCT Pub. No.: WO2020/144303
PCT Pub. Date: Jul. 16, 2020

(65) Prior Publication Data
US 2022/0252177 A1   Aug. 11, 2022

(30) Foreign Application Priority Data

Jan. 11, 2019  (DE) ...................... 10 2019 100 663.5
Mar. 20, 2019  (DE) ...................... 20 2019 101 602.7

(51) Int. Cl.
*F16K 27/04*      (2006.01)
*F16K 27/10*      (2006.01)
(Continued)

(52) U.S. Cl.
CPC ............ *F16K 27/10* (2013.01); *F16K 3/0209* (2013.01); *F16K 3/0236* (2013.01); *F16K 3/34* (2013.01); *F16K 27/044* (2013.01); *F16K 27/105* (2013.01)

(58) Field of Classification Search
CPC ...... F16K 27/105; F16K 27/10; F16K 27/044; F16K 3/0209; F16K 3/02; F16K 3/0236; F16K 3/34
See application file for complete search history.

(56) References Cited

U.S. PATENT DOCUMENTS 2,034,418 A * 3/1936 Plant ..................... F16K 27/105
                                                      251/366
2,626,775 A * 1/1953 Lange ................... F16K 27/047
                                                      137/315.31
(Continued)

FOREIGN PATENT DOCUMENTS

DE       1045751       1/1956
DE       1777150      11/1958
(Continued)

OTHER PUBLICATIONS

Internationaler Recherchenbericht und Schriftlicher Bescheid [International Search Report and the Written Opinion] dated Apr. 17, 2020 From the International Searching Authority Re. Application No. PCT/EP2020/050482 and Its Translation of Search Report Into English. (13 Pages).

*Primary Examiner* — David Colon-Morales

(57) ABSTRACT

The invention relates to a shut-off valve for pipes, having: a housing which forms a passage; a shut-off unit having a slide valve for opening and shutting off the passage; at least one first connection flange, which is arranged on the housing and is connected to the passage, for connection to a first pipe end; and at least one second connection flange, which is arranged on the housing and connected to the passage, for connection to a second pipe end.

9 Claims, 6 Drawing Sheets

(51) Int. Cl.
*F16K 3/02* (2006.01)
*F16K 3/34* (2006.01)

(56) References Cited

U.S. PATENT DOCUMENTS

| | | | | |
|---|---|---|---|---|
| 2,904,306 A * | 9/1959 | Bryant | ............... | F16K 27/105 |
| | | | | 29/890.129 |
| 3,442,286 A * | 5/1969 | Anderson | ............... | F16K 3/36 |
| | | | | 251/327 |
| 3,743,244 A * | 7/1973 | Dickenson | ............... | F16K 3/14 |
| | | | | 251/327 |
| 3,743,246 A * | 7/1973 | Heller | ............... | F16K 27/105 |
| | | | | 251/367 |
| 3,871,616 A * | 3/1975 | Taylor | ............... | F16K 27/044 |
| | | | | 251/327 |
| 3,955,591 A * | 5/1976 | Baumann | ............... | F16K 47/02 |
| | | | | 137/625.33 |
| 4,054,978 A * | 10/1977 | Freeman | ............... | B23P 6/00 |
| | | | | 228/119 |
| 4,077,604 A * | 3/1978 | Combes | ............... | F16K 3/02 |
| | | | | 251/366 |
| 4,178,665 A * | 12/1979 | Kemp | ............... | F16K 27/105 |
| | | | | 29/446 |
| 4,260,134 A * | 4/1981 | Ripert | ............... | F16K 27/105 |
| | | | | 29/890.129 |
| 4,319,736 A * | 3/1982 | Muller | ............... | F16K 27/10 |
| | | | | 29/890.129 |
| 4,326,698 A * | 4/1982 | Constantino | ............... | F16K 27/105 |
| | | | | 251/327 |
| 4,446,883 A * | 5/1984 | Paul, Jr. | ............... | F16K 43/00 |
| | | | | 251/360 |
| 4,484,596 A * | 11/1984 | Hikade | ............... | F16K 1/10 |
| | | | | 137/315.36 |
| 4,489,756 A * | 12/1984 | Balz | ............... | F16K 3/0263 |
| | | | | 137/625.33 |
| 4,776,564 A * | 10/1988 | Westenberg | ............... | F16K 27/044 |
| | | | | 251/327 |
| 4,798,225 A * | 1/1989 | Hsiao | ............... | F16K 3/0272 |
| | | | | 137/454.2 |
| 5,618,024 A * | 4/1997 | Westenberg | ............... | F16K 3/207 |
| | | | | 251/159 |
| 7,017,886 B1 * | 3/2006 | Ngene-Igwe | ............... | F16K 3/0227 |
| | | | | 251/326 |
| 7,481,239 B2 * | 1/2009 | McGuire | ............... | F16K 3/0272 |
| | | | | 251/327 |
| 8,813,771 B2 * | 8/2014 | Rayment | ............... | F16K 25/00 |
| | | | | 251/327 |
| 10,718,436 B2 * | 7/2020 | Powell | ............... | F16K 27/044 |
| 11,460,115 B2 * | 10/2022 | Hickie | ............... | F16K 3/314 |

FOREIGN PATENT DOCUMENTS

DE 1072854 1/1960
DE 69509900 4/1997

* cited by examiner

SHUT-OFF VALVE

RELATED APPLICATIONS

This application is a National Phase of PCT Patent Application No. PCT/EP2020/050482 having International filing date of Jan. 10, 2020, which claims the benefit of priority of German Patent Application Nos. 20 2019 101 602.7 filed on Mar. 20, 2019 and 10 2019 100 663.5 filed on Jan. 11, 2019. The contents of the above applications are all incorporated by reference as if fully set forth herein in their entirety.

FIELD AND BACKGROUND OF THE INVENTION

The invention relates to a shut-off valve for pipes, having a housing in which a passage is formed, a shut-off unit having a slide valve for opening and shutting off the passage, at least one first connection flange which is arranged on the housing and connected to the passage and is intended for connection to a first pipe end, and at least one second connection flange which is arranged on the housing and connected to the passage and is intended for connection to a second pipe end.

A shut-off valve of this kind is known from EP 3 171 064 A1. The shut-off valve described here comprises a passage which is formed in a housing and can be opened and shut off using a slide valve. The passage is connected to two connection flanges which are formed integrally on the housing and can be used for connecting the valve to flange-mounted pipe ends. The design of said shut-off valve makes installation, maintenance, and replacement complex and expensive. In the case of repair, the shut-off valve must routinely be completely removed from the pipe composite, together with the connection flanges, in order for example to be able to carry out a wear-related replacement of the slide valve and the seat rings, since these components are arranged in the housing in an inaccessible manner. When installing the shut-off valve, the connection flanges must be laboriously connected to corresponding connection points that are required at the pipe ends. Furthermore, the detachment of the connection flange from the pipe composite requires laborious sealing of the connection flanges with respect to the pipe ends upon reinsertion. Moreover, the connection flanges make the housing of the shut-off valve heavy.

SUMMARY OF THE INVENTION

The object of the invention is therefore that of specifying an improved, more lightweight shut-off valve, which allows for simple maintenance and repair, and simple installation.

This object is achieved by a shut-off valve having the features of claim 1. An improved, more lightweight shut-off valve of this kind allows for simple maintenance and repair, and simple installation.

Since the connection flanges are fastened to the housing by means of releasable screw connections, and the connection flanges comprise weld surfaces for weldable connection to the pipe ends, the housing of the shut-off valve can be very easily installed in a pipe composite, between two pipe ends. For this purpose, the shut-off valve, together with the connection flanges screwed to the housing, is inserted easily between the pipe ends, and welded tightly to the pipe ends via the weld surfaces. The housing can also be easily removed from the pipe composite by releasing the screw connections, without the need to separate the connection flanges from the pipe ends, at the welded connections. As a result, the connection flanges are still optimally aligned in the pipe composite for the re-insertion of the housing, such that a high level of tightness can be quickly achieved again. During maintenance, the connection flanges thus remain in the pipe composite, which simplifies the accessibility of the components arranged in the housing for the purpose of a replacement.

Since the connection flanges are fastened to the housing by means of welded connections, and the connection flanges comprise weld surfaces for weldable connection to the pipe ends, the housing of the shut-off valve can be very easily installed in a pipe composite, between two pipe ends. For this purpose, the shut-off valve, comprising the connection flanges welded to the housing, is inserted easily between the pipe ends, and welded tightly to the pipe ends via the weld surfaces.

Advantageous embodiments and developments of the invention can be found in the dependent claims. It should be noted that the features set out individually in the claims can also be combined with one another in any desired and technologically reasonable manner, and thus reveal further embodiments of the invention.

According to an advantageous embodiment of the invention, it is provided for the passage to extend straight through the housing. A straight passage avoids wear, which may occur in the case of non-straight passages, e.g. due to cavitation.

An embodiment is particularly preferred in which the connection flanges are arranged on opposing sides of the housing. Arranging the connection flanges on opposing sides allows for a simple alignment of the housing between the connection flanges. Furthermore, the opposingly arranged connection flanges simplify the installation of the valve.

According to a particularly advantageous embodiment of the invention, the slide valve is contacted by replaceable seat bushings when shutting off the passage. The arrangement or use of replaceable seat bushings makes it possible to overcome wear-related attrition in the event of contact between the slide valve and seat bushings when shutting off the passage, in particular by means of the simple replacement of the seat bushings. As a result, lasting tightness of the shut-off valve can be achieved by simple replacement of the seat bushings.

According to an advantageous embodiment of the invention, the connection flanges rest on the seat bushings which protrude into the housing. The connection flanges resting on the seat bushings which protrude into the housing allows for secure retention of the seat bushings in the housing. When the housing is removed from the connection flanges, the seat bushings are moreover more easily accessible for replacement.

An embodiment is particularly advantageous in which the seat bushings each comprise sealing arrangements for sealing with respect to the connection flanges and the housing. As a result of the sealing arrangements on the seat bushings, the sealing arrangements are renewed simultaneously when the seat bushings are renewed, such that an excellent sealing of the shut-off valve can be achieved very easily following replacement of the seat bushings.

According to an advantageous embodiment of the invention, the connection flanges are formed integrally on the seat bushings which protrude into the housing. In this way, worn seat bushings can be changed directly, together with the connection flanges, following separation of the welded connection flanges from the pipe ends. In this case, the connection flanges form a wearing part, together with the seat bushings, which part is replaced or renewed when the shut-off valve is installed again.

An embodiment is particularly advantageous in which the seat bushings are positioned in seat bushing receptacles formed on the housing, which receptacles secure the seat bushings between the connection flanges and the housing in order to form the welded connection. Positioning the seat bushings in the seat bushing receptacles formed on the housing allows for said bushings to be aligned in a simple manner, such that a high degree of tightness relative to the slide valve can be achieved by insertion of the seat bushings, before said seat bushings are connected to the housing by means of the welded connection.

According to an advantageous embodiment, the seat bushings line the passage in the housing. Lining the passage by the seat bushings makes it possible for wear on the seat bushings, resulting from cavitation, to be easily overcome by replacing the seat bushings, possibly together with the connection flanges. Lining the passage with the seat bushings prevents cavitation from occurring on the housing itself. As a result, wear to the housing is effectively prevented by the lining with the seat bushings.

According to a preferred embodiment of the invention, the slide valve is replaceable. Replacing the slide valve makes it possible for wear-related attrition, which impairs the tightness of the shut-off valve, to be easily overcome.

An embodiment is particularly advantageous in which the slide valve comprises a passage opening, the geometry of which can be varied by replacing the slide valve. The variation in the geometry of the passage opening of the slide valve makes it possible for the shut-off valve to be used as a check valve, as a control valve, or also for throttling.

BRIEF DESCRIPTION OF THE SEVERAL VIEWS OF THE DRAWINGS

Further features, details and advantages of the invention can be found from the following description and with reference to the drawings which show exemplary embodiments of the invention. Mutually corresponding objects or elements are provided with the same reference characters in all the figures. In the drawings.

DESCRIPTION OF SPECIFIC EMBODIMENTS OF THE INVENTION

Figure 1:
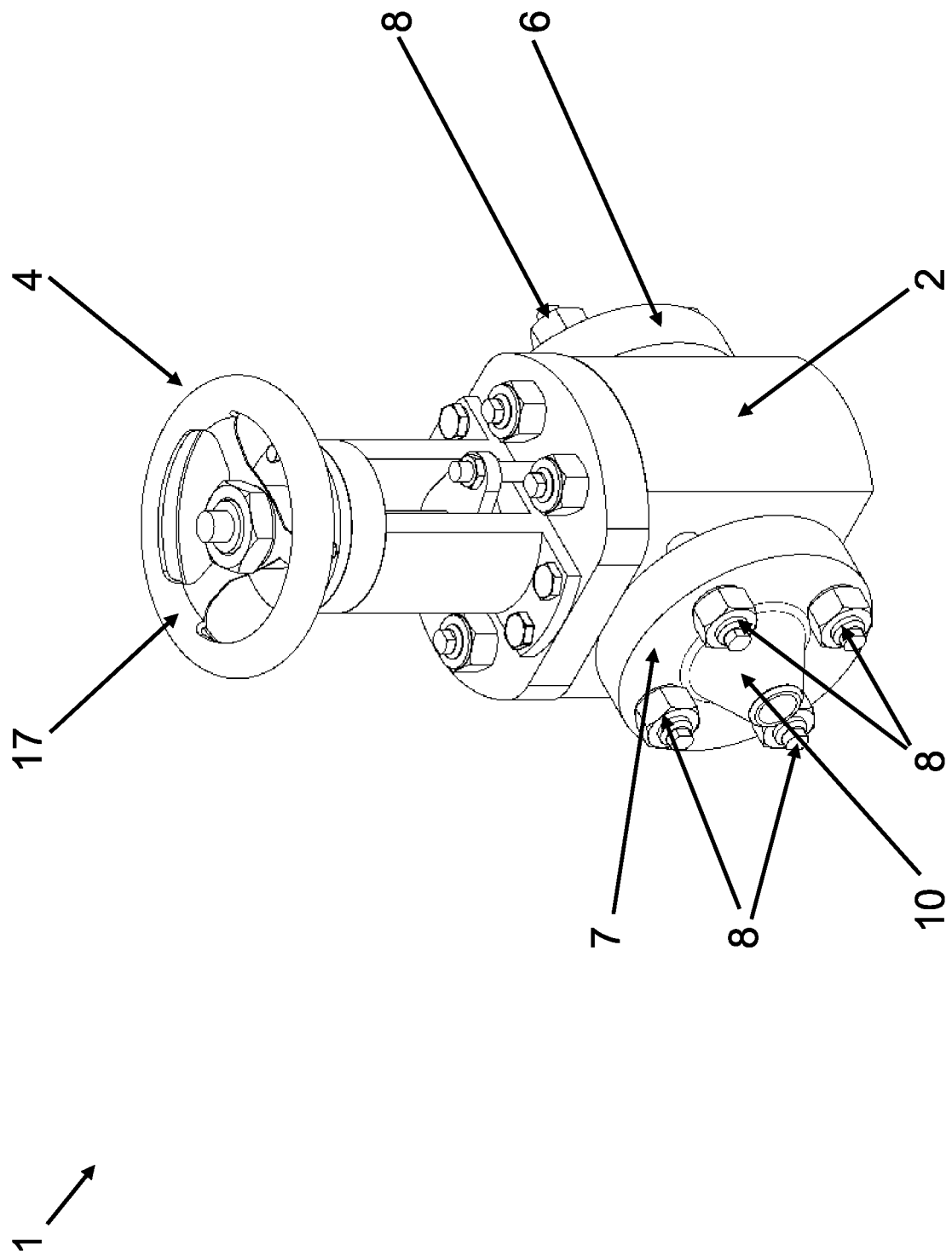
FIG. 1 shows a shut-off valve.
Figure 2:
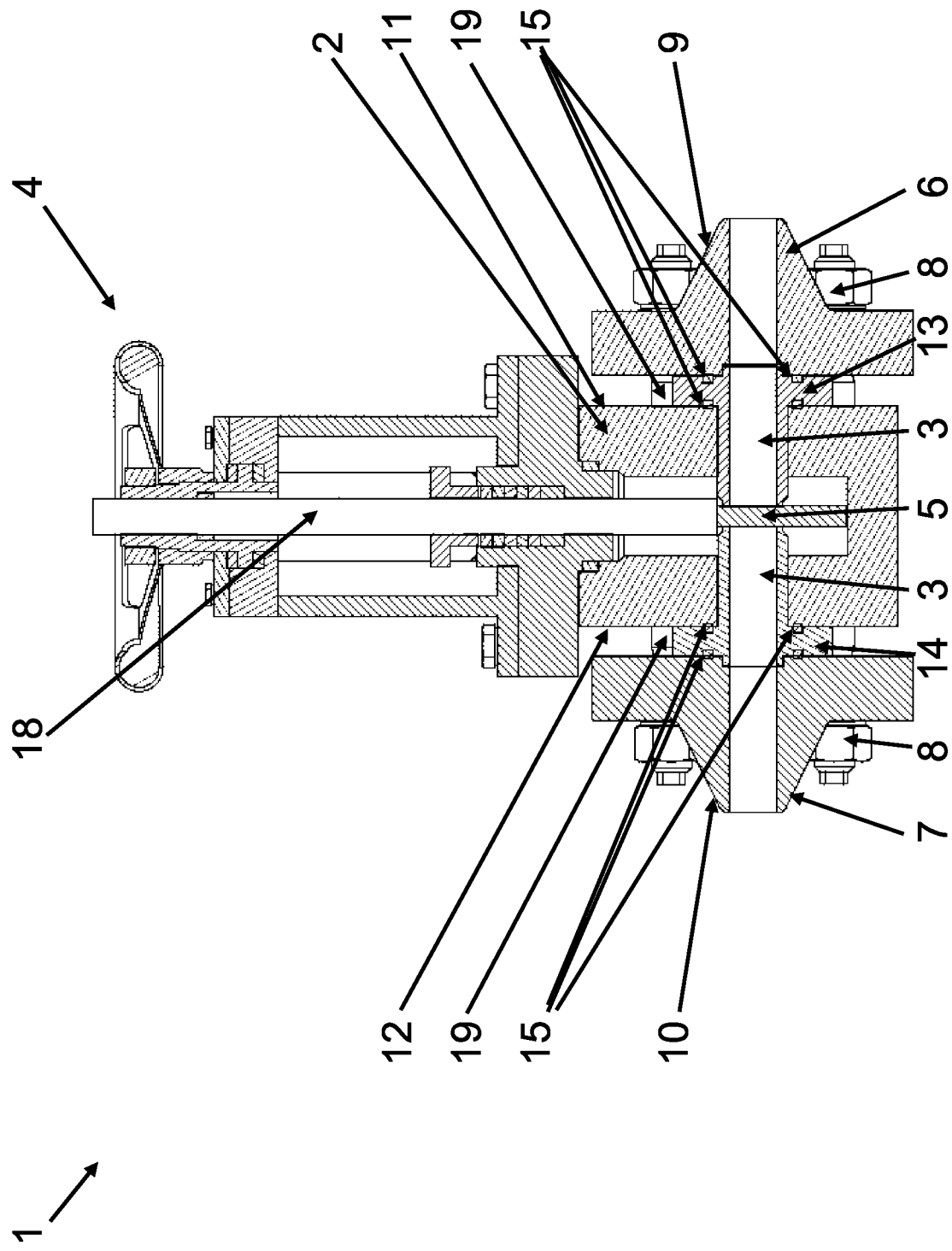
FIG. 2 is a cross section through the shut-off valve.

FIG. 1 shows a shut-off valve according to the invention, denoted by reference character 1. The shut-off valve 1 comprises a housing 2 in which a straight passage 3 (FIG. 2) is formed. Said passage 3 (FIG. 2) can be opened and shut off by means of a slide valve 5 (FIG. 2), in that a shut-off unit 4 is actuated. For this purpose, the shut-off unit 4 comprises a handwheel 17 which actuates an arbor 18 (FIG. 2) by means of which it is possible to displace the slide valve 5 (FIG. 2) in the passage 3 (FIG. 2). Two connection flanges 6, 7, which are connected to the passage 3 (FIG. 2), are arranged on opposing sides 11, 12 (FIG. 2) of the housing 2. A first connection flange 6 serves for connection to a first pipe end, while a second connection flange 7 serves for connection to a second pipe end. The connection flanges 6, 7 are fastened to the housing 2 by means of screw connections 8. As a result, the connection flanges 6, 7 can be easily released from the housing 2 for maintenance work, without the connection flanges 6, 7 having to be separated from the welded connections at the pipe ends. As a result, the connection flanges 6, 7 are still optimally aligned in the pipe composite for the re-insertion of the housing 2, such that a high level of tightness can be quickly achieved again. The connection flanges 6, 7 comprise weld surfaces 9, 10 which are used for establishing a welded connection with pipe ends to be connected (not shown). As a result, the shut-off valve 1 can be easily connected to a pipe composite via the connection flanges 6, 7. For this purpose, the shut-off valve 1, together with the connection flanges 6, 7 screwed to the housing 2, is inserted easily between the pipe ends, and welded tightly to the pipe ends via the weld surfaces 9, 10.

Figure 6A:
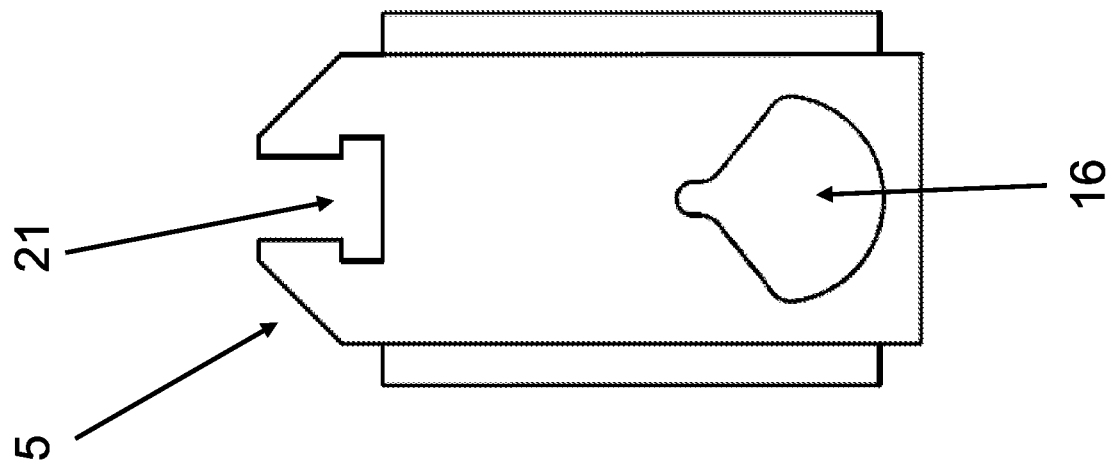
FIG. 6, 6a are plan views of variants of the slide valve.
Figure 6:
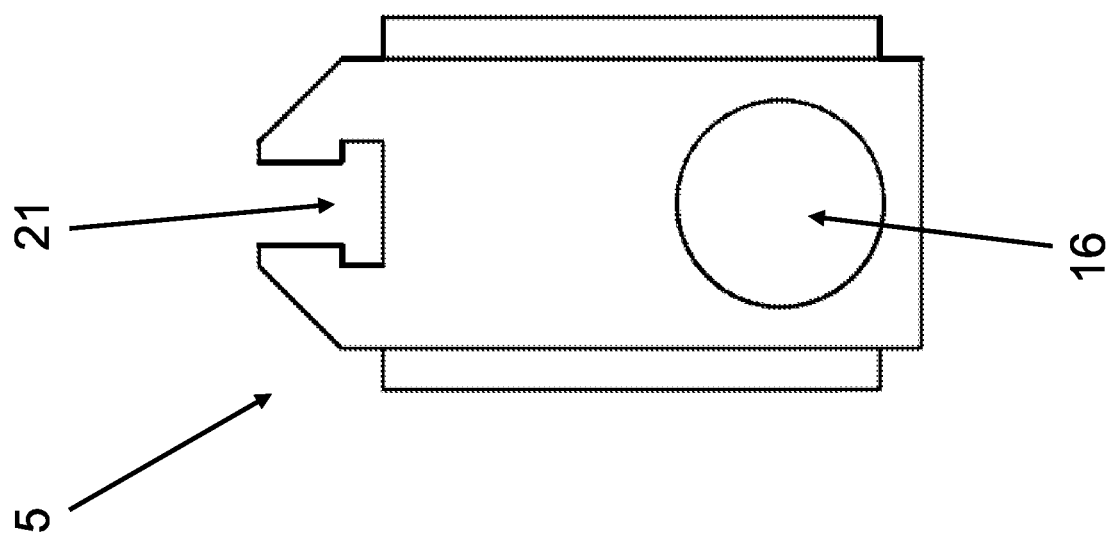

FIG. 2 is a sectional view through the shut-off valve according to FIG. 1. In this view, the passage 3 which is formed straight, in the housing 2, is visible between the two connection flanges 6, 7 which are arranged on the opposing sides 11, 12. The connection flanges 6, 7 are fastened to the housing 2 by means of bolts 19 extending through the housing 2. The screw connections 8 can be released for maintenance work, such that the connection flanges 6, 7 can be separated from the housing 2 for maintenance work. During maintenance, the connection flanges 6, 7 thus remain in the pipe composite, which simplifies the accessibility of the components 5, 13, 14 arranged in the housing 2 for the purpose of a replacement. The connection flanges 6, 7 rest on seat bushings 13, 14, which protrude into the housing 2 to such an extent that they contact the slide valve 5 when the passage 3 is shut off thereby, as shown in FIG. 2. The contact between the seat bushings 13, 14 and the slide valve 5 makes it possible to achieve a tight shut-off of the pipeline joint in the passage 3. In the event of wear of the seat bushings 13, 14, these can be replaced very easily. Since the seat bushings 13, 14 protrude into the housing 2, and in this case line the passage 3 in the housing 2, wear-related attrition occurs merely on the seat bushings 13, 14, and not on the housing 2 itself. The wear on the shut-off valve 1 can thus be overcome by exchanging the seat bushings 13, 14. The seat bushings 13, 14 comprise sealing arrangements 15 which offer sealing with respect to the connection flanges 6, 7 and with respect to the housing 2. By replacing the seat bushings 13, 14, the sealing arrangements 15 are also renewed, such that a high level of tightness of the shut-off valve 1 is ensured, even following repairs. By screwing the connection flanges 6, 7 to the housing 2, the seat bushings 13, 14 in contact on the connection flanges 6, 7 are fixed in the housing 2 and thus achieve optimal securing. The slide valve 5 is a component that is separate from the arbor 18 of the shut-off unit 4, such that said valve can also be easily replaced during maintenance works. Wear on the slide valve 5 can thus also be easily overcome. By replacing the slide valve 5, the geometry of the passage opening 16 (FIG. 6, 6a) formed in the slide valve 5 can also be varied. In this respect, different geometrical embodiments of the through-openings 16 (FIG. 6, 6a) are shown in FIGS. 6 and 6a. The through-opening shown in FIG. 6 is suitable in particular for selective complete opening and shutting-off of the passage 3. In contrast, the geometry of the through-opening shown in FIG. 6a allows for flow regulation, since the cross section of the through-opening, which is opened, depending on the position of the slide valve, varies in a more or less linear manner in the movement direction of the slide valve.

Figure 3:
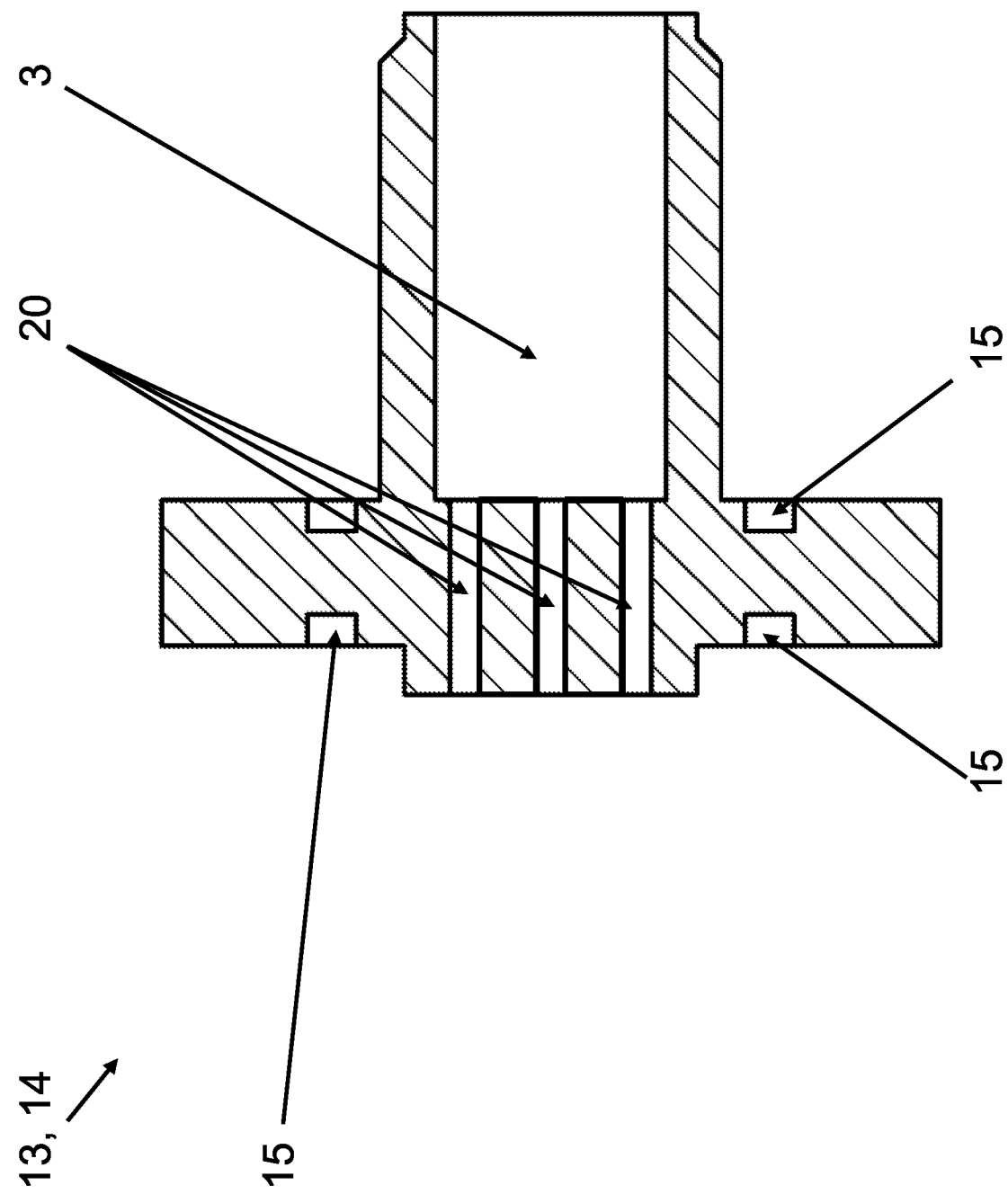
FIG. 3 is a cross section through the seat bushing.

FIG. 3 is a cross section through a seat bushing 13, 14 which can be used as an alternative to the seat bushings 13, 14 shown in FIG. 2. Said seat bushing 13, 14 comprises a passage 3 which is reduced to a plurality of small through-openings 20. A reduced passage 3 of this kind makes it possible for throttling to be achieved by means of the seat bushing 13, 14 which can be used alternatively.

Figure 4:
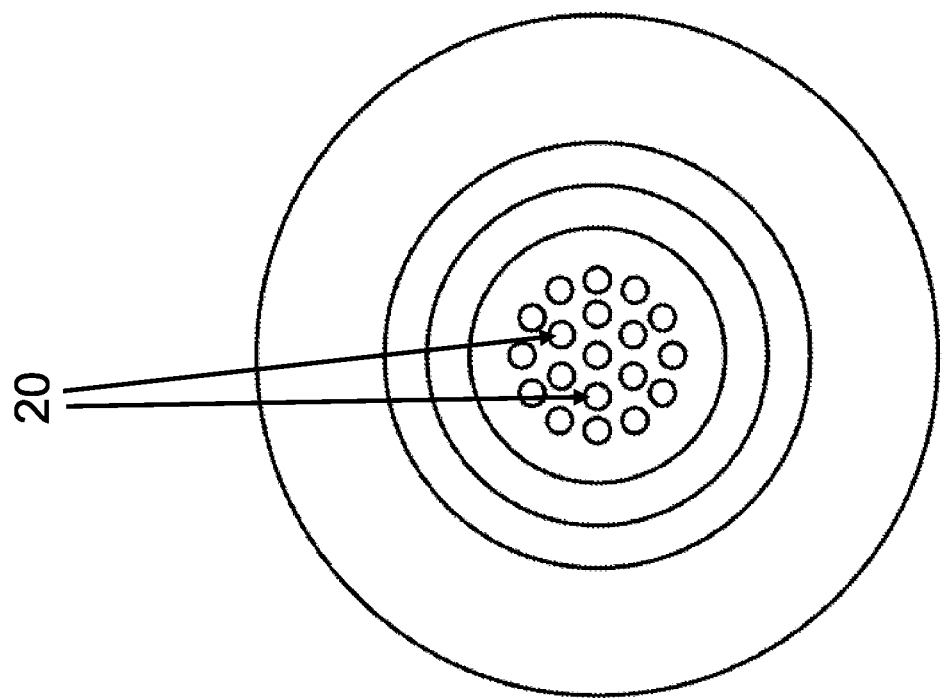
FIG. 4 is a plan view of the seat bushing.

FIG. 4 is a plan view of the seat bushing 13, 14 according to FIG. 3. It is clearly visible, in this view, that the through-openings 20 are uniformly distributed in the passage 3 (FIG. 3), such that a uniform, throttled flow can be achieved in the passage 3 (FIG. 3) in the event of release by the slide valve 5 (FIG. 2).

Figure 5:
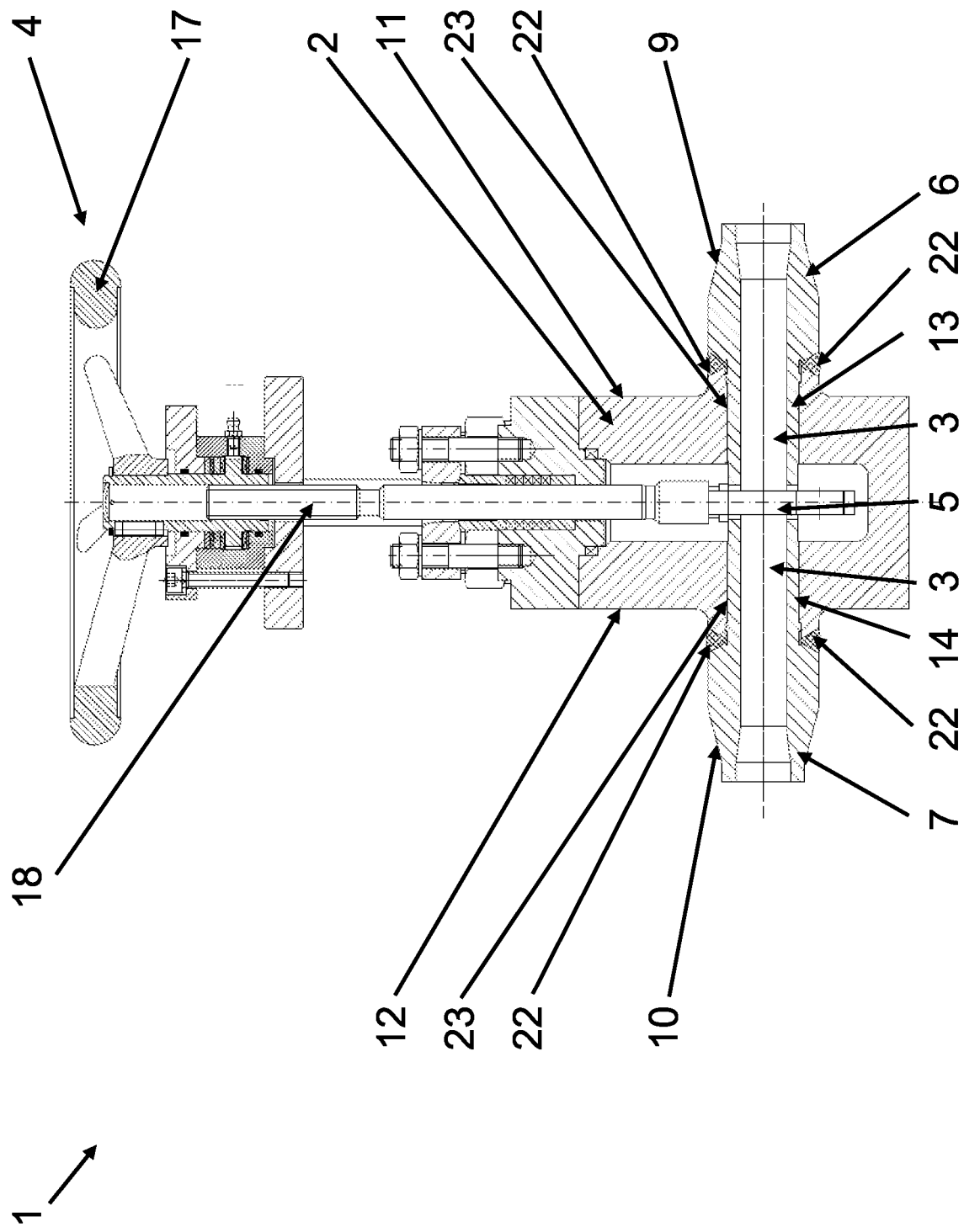
FIG. 5 is a cross section through a further shut-off valve.

FIG. 5 is a cross section of a further shut-off valve according to the invention, denoted by reference character 1. The shut-off valve 1 also comprises a housing 2 in which a straight passage 3 is formed. Said passage 3 can be opened and shut off by means of a slide valve 5, in that a shut-off unit 4 is actuated. For this purpose, the shut-off unit 4 comprises a handwheel 17 which actuates an arbor 18 by means of which it is possible to displace the slide valve 5 in the passage 3. Two connection flanges 6, 7, which are connected to the passage 3, are arranged on opposing sides 11, 12 of the housing 2. A first connection flange 6 serves for connection to a first pipe end, while a second connection flange 7 serves for connection to a second pipe end (e.g. by welding). In the embodiment shown here, the connection flanges 6, 7 are fastened to the housing 2 by means of welded connections 22. As a result, the connection flanges 6, 7 can be easily connected to the housing. The connection flanges 6, 7 comprise weld surfaces 9, 10 which are used for establishing a welded connection with pipe ends to be connected (not shown). As a result, this shut-off valve 1 can also be easily connected to a pipe composite via the connection flanges 6, 7. For this purpose, the shut-off valve 1, together with the connection flanges 6, 7 welded to the housing 2, is inserted easily between the pipe ends, and welded tightly to the pipe ends via the weld surfaces 9, 10. In this embodiment, the connection flanges 6, 7 are advantageously integrally formed on seat bushings 13, 14, which protrude into the housing 2 to such an extent that they contact the slide valve 5 when the passage 3 is shut off thereby, as shown in FIG. 5. The contact between the seat bushings 13, 14 and the slide valve 5 makes it possible to achieve a tight shut-off of the pipeline joint in the passage 3. In the event of wear of the seat bushings 13, 14, these can be replaced. Since the seat bushings 13, 14 protrude into the housing 2, and in this case line the passage 3 in the housing 2, wear-related attrition occurs merely on the seat bushings 13, 14, and not on the housing 2 itself. The wear on the shut-off valve 1 can thus be overcome by exchanging the seat bushings 13, 14. By replacing the seat bushings 13, 14, the connection flanges 6, 7 are also renewed in the case of the embodiment shown here, such that a high level of tightness of the shut-off valve 1 is ensured, even following re-installation into a pipe composite. By welding the connection flanges 6, 7 to the housing 2, the seat bushings 13, 14 fastened to the connection flanges 6, 7 are fixed in the housing 2 and thus achieve stable securing. In order to optimally position the seat bushings 13, 14, together with the connection flanges 6, 7, in the housing 2, the housing 2 comprises seat bushing receptacles 23 which secure the seat bushings 13, 14 between the connection flanges 6, 7 and the housing 2 in order to form the welded connection 22. The slide valve 5 is a component that is separate from the arbor 18 of the shut-off unit 4, such that said valve can also be easily replaced during maintenance works. Wear on the slide valve 5 can thus also be easily overcome. By replacing the slide valve 5, the geometry of the passage opening 16 (FIG. 6, 6a) formed in the slide valve 5 can also be varied. In this respect, different geometrical embodiments of the through-openings 16 (FIG. 6, 6a) are shown in FIGS. 6 and 6a. The through-opening shown in FIG. 6 is suitable in particular for selective complete opening and shutting-off of the passage 3. In contrast, the geometry of the through-opening shown in FIG. 6a allows for flow regulation, since the cross section of the through-opening, which is opened, depending on the position of the slide valve, varies in a more or less linear manner in the movement direction of the slide valve.

The slide valves 5 shown in FIGS. 6 and 6a have a fastening geometry 21, which is clearly visible in the drawings. Said fastening geometry 21 makes it possible to easily fix the slide valve 5 on the arbor 18 in the case of replacement (FIGS. 2 and 5).

LIST OF REFERENCE CHARACTERS

1 Shut-off valve
2 Housing
3 Passage
4 Shut-off unit
5 Slide valve
6 First connection flange
7 Second connection flange
8 Screw connections
9 First weld surface
10 Second weld surface
11 First side
12 Second side
13 First seat bushing
14 Second seat bushing
15 Sealing arrangements
16 Passage opening
17 Handwheel
18 Arbor
19 Bolts
20 Through-openings
21 Fastening geometry
22 Welded connection
23 Seat bushing receptacle

The invention claimed is:

1. A shut-off valve for pipes, comprising
a housing in which a passage is formed,
a shut-off unit comprising a slide valve for opening and shutting off the passage,
at least one first connection flange which is arranged on the housing and connected to the passage, for connection to a first pipe end, and
at least one second connection flange which is arranged on the housing and connected to the passage for connection to a second pipe end, wherein
the connection flanges are fastened to the housing by releasable screw connections or welded connections, and the connection flanges comprise weld surfaces for weldable connection to the pipe ends;
wherein the slide valve is contacted by replaceable seat bushings when shutting off the passage;
wherein the connection flanges rest on the replaceable seat bushings that protrude into the housing;
wherein the connecting flanges are fastened to the housing by screw bolts extending through the housing;
wherein the seat bushings resting on the connecting flanges are fixed and secured in the housing by screwing the connecting flanges to the housing.

2. The shut-off valve according to claim 1, wherein the passage extends straight through the housing.

3. The shut-off valve according to claim 1, wherein the connection flanges are arranged on opposite sides of the housing.

4. The shut-off valve according to claim 1, wherein the replaceable seat bushings each comprise sealing arrangements for sealing with respect to the connection flanges and the housing.

5. The shut-off valve according to claim 1, wherein the connection flanges are integrally formed with the replaceable seat bushings that protrude into the housing.

6. The shut-off valve according to claim 5, wherein the replaceable seat bushings are positioned in seat bushing receptacles formed on the housing, which receptacles secure the replaceable seat bushings between the connection flanges and the housing in order to form the welded connection.

7. The shut-off valve according to claim 1, wherein the replaceable seat bushings line the passage in the housing.

8. The shut-off valve according to claim 1, wherein the slide valve is replaceable.

9. The shut-off valve according to claim 8, wherein the slide valve comprises a passage opening, the geometry of which can be varied by replacing the slide valve.

* * * * *